United States Patent
Alaze et al.

(10) Patent No.: US 9,470,247 B2
(45) Date of Patent: Oct. 18, 2016

(54) HYDRAULIC BLOCK FOR A SLIP-CONTROLLED VEHICLE BRAKE SYSTEM

(71) Applicant: Robert Bosch GmbH, Stuttgart (DE)

(72) Inventors: Norbert Alaze, Markgroeningen (DE); Edgar Kurz, Heilbronn-Horkheim (DE); Rene Schepp, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/284,015

(22) Filed: May 21, 2014

(65) Prior Publication Data

US 2014/0345720 A1 Nov. 27, 2014

(30) Foreign Application Priority Data

May 24, 2013 (DE) .................. 10 2013 209 727

(51) Int. Cl.
| | |
|---|---|
| *F16D 65/00* | (2006.01) |
| *F15B 13/08* | (2006.01) |
| *B60T 17/02* | (2006.01) |
| *B60T 13/66* | (2006.01) |
| *B60T 13/68* | (2006.01) |
| *B60T 8/36* | (2006.01) |
| *B60T 8/48* | (2006.01) |

(52) U.S. Cl.
CPC ........... *F15B 13/0814* (2013.01); *B60T 8/368* (2013.01); *B60T 13/662* (2013.01); *B60T 13/686* (2013.01); *B60T 17/02* (2013.01); *B60T 8/4872* (2013.01); *Y10T 137/85938* (2015.04)

(58) Field of Classification Search
CPC ............................ B60T 8/368; F15B 13/0814
USPC ................... 137/561 A, 598, 884; 303/119.3
See application file for complete search history.

(56) References Cited

U.S. PATENT DOCUMENTS

| | | | | |
|---|---|---|---|---|
| 5,975,652 | A * | 11/1999 | Otto ............................ | 303/113.1 |
| 6,688,707 | B1 * | 2/2004 | Dinkel .................... | B60T 8/368 |
| | | | | 303/119.3 |
| 2004/0090115 | A1 * | 5/2004 | Inoue et al. ............... | 303/119.3 |
| 2006/0220768 | A1 * | 10/2006 | Iyatani ............................ | 335/78 |
| 2007/0228820 | A1 * | 10/2007 | Nakamura ................ | 303/119.3 |
| 2010/0207446 | A1 * | 8/2010 | Tandler et al. ................. | 303/10 |
| 2010/0276925 | A1 * | 11/2010 | Bareiss et al. ............. | 285/125.1 |
| 2011/0036434 | A1 * | 2/2011 | Fischbach-Borazio | |
| | | | et al. ............................. | 137/861 |
| 2013/0306180 | A1 * | 11/2013 | Weh .............................. | 137/884 |
| 2013/0319562 | A1 * | 12/2013 | Weh .............................. | 137/884 |

* cited by examiner

*Primary Examiner* — John Fox
*Assistant Examiner* — Reinaldo Sanchez-Medina
(74) *Attorney, Agent, or Firm* — Maginot, Moore & Beck LLP

(57) ABSTRACT

A hydraulic block for a slip-controlled vehicle brake system has a plurality of receptacles configured to receive hydraulic components, such as solenoid valves, hydraulic accumulators, hydraulic pumps, and gear pumps, and includes connectors for external components of the vehicle brake system, and facilitates a flat hydraulic block.

15 Claims, 3 Drawing Sheets

HYDRAULIC BLOCK FOR A SLIP-CONTROLLED VEHICLE BRAKE SYSTEM

This application claims priority under 35 U.S.C. §119 to patent application no. DE 10 2013 209 727.1, filed on May 24, 2013 in Germany, the disclosure of which is incorporated herein by reference in its entirety.

The disclosure relates to a hydraulic block for a slip-controlled vehicle brake system.

BACKGROUND

Slip-controlled hydraulic vehicle brake systems are known. They make antilock brake systems, antislip regulation means and/or driving dynamics/antiskid regulation means possible for which abbreviations such as ABS, ASR and FDR/ESP are customary. The construction and function of slip-controlled vehicle brake systems are known and are not to be explained here.

Hydraulic blocks which have receptacles for the components and connectors for external components of the vehicle brake system are known for fastening and hydraulically connecting hydraulic components of slip-controlled vehicle brake systems. Hydraulic components of slip-controlled vehicle brake systems are, for example, hydraulic pumps, solenoid valves, hydraulic accumulators, damper chambers and pressure sensors. External components are, in particular, a brake master cylinder, to which the hydraulic block is connected, and wheel brakes which are connected to the hydraulic block. The lists are in each case not comprehensive. Connectors for the external components are, for example, screw or crimp connectors, that is to say connectors which are fastened by way of calking. The receptacles for the components are typically countersunk depressions or bores, also of stepped configuration, into which the components or at any rate their hydraulic parts are inserted. For example, magnet coils and armatures of solenoid valves project to the outside from the hydraulic block. The receptacles are connected to one another, that is to say connected hydraulically, by way of bores. An electric motor for driving the hydraulic pumps is typically attached on the outside of the hydraulic block. The hydraulic block which is fitted with the components can also be considered to be a hydraulic assembly of a slip-controlled vehicle brake system.

The hydraulic blocks of slip-controlled vehicle brake systems are typically cuboidal metal blocks made, for example, from an aluminum alloy; they are often approximately square in plan view. The hydraulic blocks are normally drilled perpendicularly and parallel to their sides, that is to say in a Cartesian manner.

SUMMARY

The hydraulic block according to the disclosure for a slip-controlled vehicle brake system has a receptacle for a gear pump as hydraulic pump for the slip control means. The gear pump is, in particular, an internal gear pump. For a dual-circuit vehicle brake system, two receptacles for gear pumps are preferably provided, or in general one gear pump for each brake circuit.

The receptacle for the gear pump has a pump connector on a bottom of the receptacle and/or a pump connector on a circumference of the receptacle. The pump connectors are a pump inlet and/or a pump outlet, that is to say a suction connector and/or a pressure connector of the gear pump. In the hydraulic block, the pump connectors are configured, in particular, as bores which open on the bottom and/or on the circumference of the receptacle for the gear pump. Here, bores are to be understood to mean lines, in particular connecting lines between the receptacles and connectors of the hydraulic block, which do not necessarily have to be produced by drilling, but rather can also be produced in some other way.

One advantage of the disclosure is the use of gear pumps as hydraulic pumps of a slip control means of a hydraulic vehicle brake system. In comparison with piston pumps, hydraulic pumps have the advantage of a higher delivery capacity and lower pressure pulses of the delivered brake fluid. It is a further advantage that gear pumps of flat design make a flat hydraulic block possible.

In an embodiment there is a circumferential channel on the circumference of the receptacle for the gear pump, which circumferential channel communicates with the pump connector on the circumference. The circumferential channel connects the pump connector on the gear pump to a connector bore in the hydraulic block which opens into the circumferential channel. As a result of the channel, the pump connector on the gear pump and the connector bore in the hydraulic block can be at different circumferential points. The circumferential channel can be, for example, a circumferential groove in the receptacle for the gear pump. Another possibility is an annular step in the receptacle for the gear pump and an annular step on the circumference of the gear pump which is produced, for example, in a cartridge design, that is to say has a cartridge as pump housing. A clearance which forms the circumferential channel exists between the annular steps of the receptacle for the gear pump and the gear pump itself. The channel is delimited on the inside by the internal gear pump, for example its cartridge, on the outside by a circumferential face of the receptacle for the gear pump in the hydraulic block, and on the end sides by end faces of the annular steps of the receptacle for the inner gear pump in the hydraulic block and the gear pump, for example its cartridge.

In an embodiment there is a suction connector of the gear pump, that is to say a pump inlet on the bottom of the receptacle for the gear pump and/or a pressure connector, that is to say a pump outlet on a circumference of the receptacle for the gear pump in the hydraulic block. In this case, in the way which was explained above, the pressure connector of the gear pump can be realized by way of a circumferential channel in the receptacle for the gear pump or between the receptacle for the gear pump and the gear pump, which channel makes a circumferential offset of the pressure connector on the gear pump and in the receptacle of the hydraulic block possible.

In an embodiment there is a hydraulic block which is mirror-symmetrical with respect to a center longitudinal axis of the hydraulic block. This refinement of the disclosure is provided, in particular, for a dual circuit vehicle brake system with two gear pumps and two receptacles for the gear pumps in the hydraulic block. Complete mirror symmetry is not necessary, and there can be deviations in the bores of the hydraulic block on both sides of the center longitudinal plane and/or deviations in the hydraulic connection of the two brake circuits.

Further features are apparent from the disclosure. The individual features can be realized in each case per se or collectively in any desired combination in embodiments of the disclosure, embodiments with a different hydraulic pump than a gear pump, for example a piston pump, also being possible.

DETAILED DESCRIPTION

Figure 1:
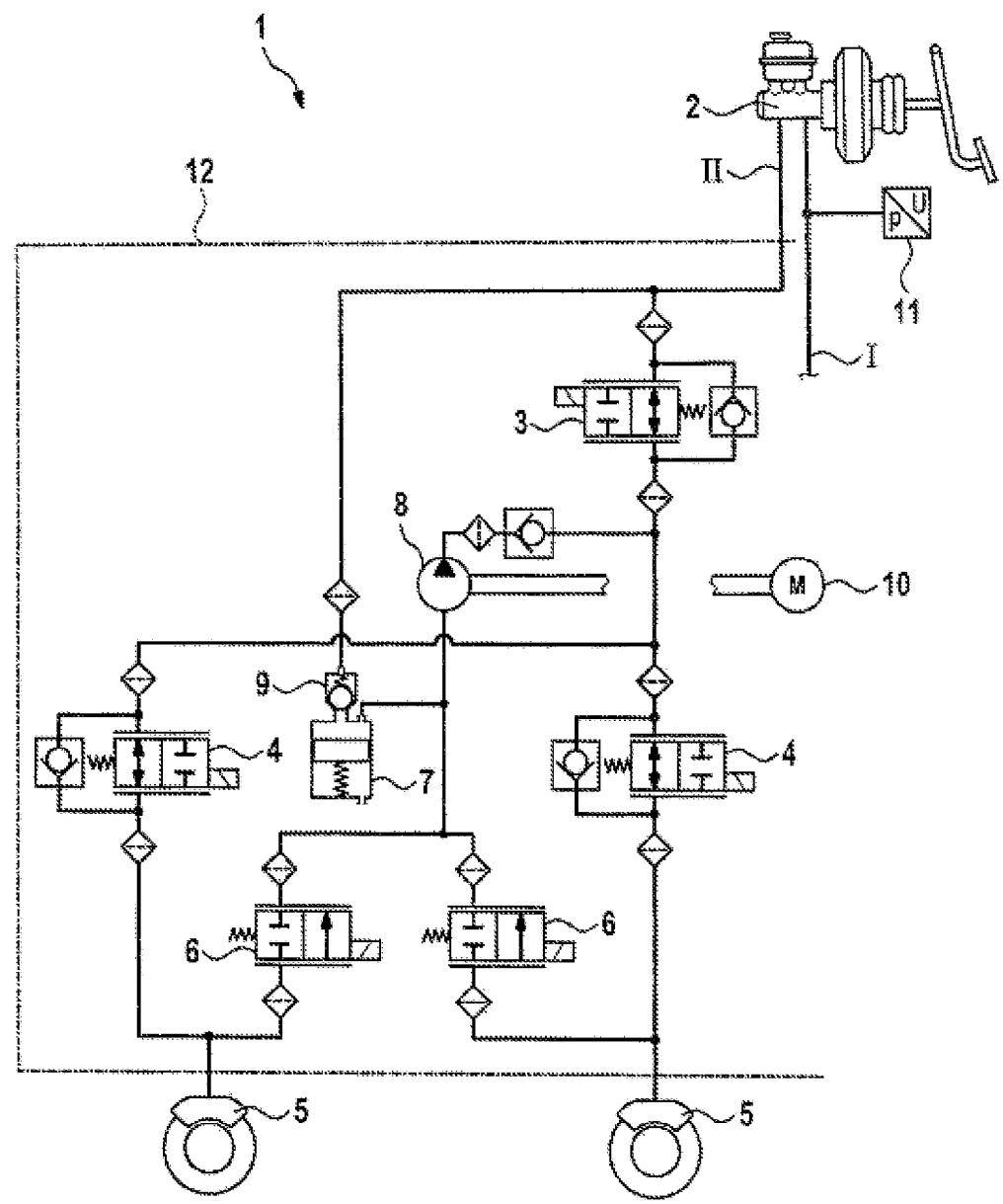
FIG. 1 shows a hydraulic circuit diagram of a brake circuit of a slip-controlled hydraulic vehicle brake system.

FIG. 1 shows a hydraulic circuit diagram of a brake circuit II of a slip-controlled hydraulic dual circuit vehicle brake system I. The other brake circuit I (not illustrated) is of identical construction with the exception of small deviations and functions in the same way. The vehicle brake system I has a dual circuit brake master cylinder 2, to which the brake circuits I, II are connected via in each case one separating valve 3. Wheel brakes 5 are connected to the separating valve 3 via brake pressure build-up valves 4. Via brake pressure reducing valves 6, the wheel brakes 5 are connected to a hydraulic accumulator 7 and to a suction side of a hydraulic pump 8. The suction side of the hydraulic pump 8 can also be considered to be a suction connector or pump inlet. A pressure side of the hydraulic pump 8 which can also be considered to be a pressure connector or pump outlet is connected between the brake pressure build-up valves 4 and the separating valve 3. The hydraulic accumulator 7 is connected to the brake master cylinder 2 via a hydraulically controlled pressure limiting valve 9 which can be flowed through from the hydraulic accumulator 7 to the brake master cylinder 2. The pressure limiting valve 9 is controlled by the brake master cylinder pressure. There is in each case one brake pressure build-up valve 4 and in each case one brake pressure reducing valve 6 for each wheel brake 5, and the brake pressure build-up valves 4 are connected hydraulically in parallel to one another, as are the brake pressure reducing valves 6. There is a hydraulic pump 8 in each brake circuit I, II, which hydraulic pumps 8 can be driven by way of an electric motor 10 which is common for both brake circuits I, II. The electric motor 10 can also be considered to be a drive motor or a pump motor. One of the two brake circuits I has a pressure sensor 11. In the described embodiment of the disclosure, the hydraulic pumps 8 are internal gear pumps of cartridge design, that is to say they have a cylindrical pump housing (not shown) which is called a cartridge. The valves 3, 4, 6 of the slip control means are solenoid valves. The pressure build-up valves 4 and pressure reducing valves 6 form wheel brake pressure modulation valve devices, by way of which wheel brake pressures can be controlled in the wheel brakes 6 on a wheel-individual basis in a manner which is known per se. The construction and function of slip-controlled hydraulic vehicle brake systems of this type are known per se and will not be explained further here.

Figure 2:
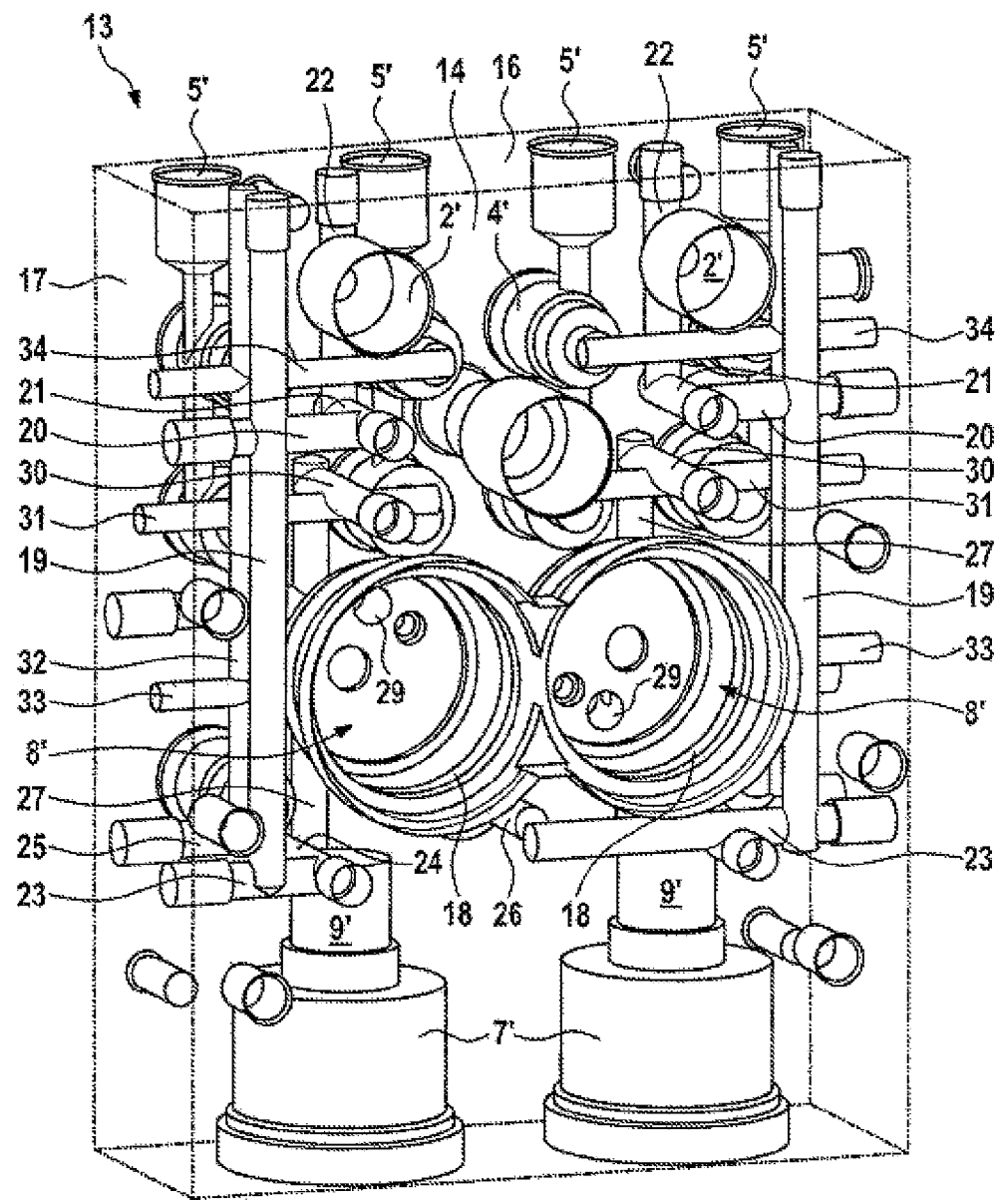
FIG. 2 shows a perspective illustration of a hydraulic block according to the disclosure with a view of an upper side of the hydraulic block.
Figure 3:
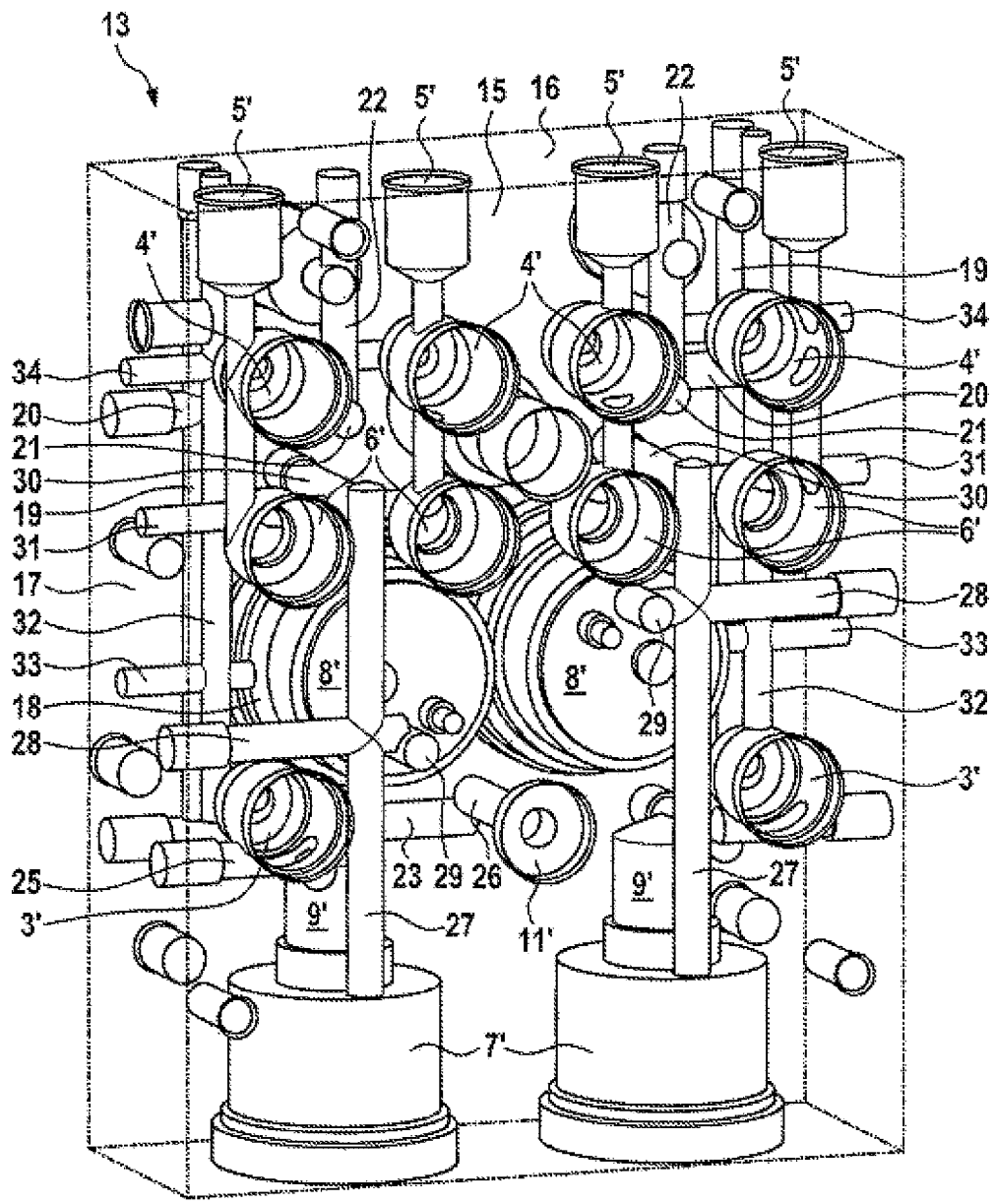
FIG. 3 shows the hydraulic block from FIG. 1 with a view of an underside of the hydraulic block.

The hydraulic components of the slip control means 12 of the hydraulic vehicle brake system 1, namely the separating valves 3, pressure build-up valves 4, pressure reducing valves 6, hydraulic accumulators 7, hydraulic pumps 8, pressure limiting valve 9 and the pressure sensor 11, are attached on or in a hydraulic block 13 and are connected hydraulically to one another. This hydraulic block 13 according to the disclosure is shown in FIGS. 2 and 3; it is illustrated in a transparent manner, in order to make its bores visible.

In the embodiment of the disclosure which is shown and described, the hydraulic block 13 is a flat, cuboidal solid part made from an aluminum alloy, and it is approximately 115 mm long, 90 mm wide and 30 mm high. The material and dimensions are not mandatory for the disclosure. For the purposes of distinction, that flat side of the hydraulic block 13 which is visible in FIG. 2 will be called the upper side 14 and the opposite flat side which is visible in FIG. 3 will be called the underside 15 in the following text. The narrow sides will be called transverse sides 16 and the longitudinal sides 17 will be called such. The designation of the sides 14 to 17 of the hydraulic block 13 is arbitrary; neither the upper side 14 has to be at the top and the underside 15 at the bottom, nor do the longitudinal sides 17 have to be longer than the transverse sides 16.

The hydraulic block 13 is drilled in a Cartesian manner, that is to say bores which are made in it run parallel or perpendicularly with respect to one another and with respect to the sides 14 to 17 of the hydraulic block 13. The bores are lines for brake fluid which do not necessarily have to be produced by drilling. Bores which run parallel to the longitudinal sides 17 will be called longitudinal bores, bores which are parallel to the transverse sides 16 will be called transverse bores and bores which are perpendicular with respect to the upper side 14 and underside 15 will be called vertical bores in the following text. The hydraulic block 13 is symmetrical with respect to a center longitudinal plane.

In its upper side 14, the hydraulic block 13 has two stepped, cylindrical countersunk depressions which are made next to one another approximately in a transverse center of the hydraulic block 13 and form receptacles 8' for the internal gear pumps 8 which serve as hydraulic pumps of the slip control means 12 of the vehicle brake system 1. In a transverse side 16 of the hydraulic block 13, four cylindrical blind bores are made as connectors 5' for the wheel brakes 5 of the vehicle brake system 1. Wheel brake lines (not illustrated) are fastened by way of crimping, that is to say by way of calking. Another fastening means of the brake lines, for example by way of screwing, is likewise possible.

Close to the narrow side 16, in which the connectors 5' for the wheel brakes 5 are made, two blind bores are made at a spacing next to one another in the upper side 14 of the hydraulic block 13 as connectors 2' for the dual circuit brake master cylinder 2. Connection by way of crimping is also provided here and other connections, for example by way of screwing, are possible. As viewed from the upper side, the connectors 2' for the brake master cylinder 2 are situated between in each case two of the four connectors 5' for the wheel brakes 5.

Two stepped, cylindrical countersunk depressions are made in the narrow side 16 which lies opposite the connectors 5' for the wheel brakes 5, as receptacles 7' for the installation of the hydraulic accumulators 7 in the hydraulic block 13. The countersunk depressions which form the receptacles 7' for the hydraulic accumulators 7 have projections of smaller diameter than receptacles 9' for the pressure limiting valves 9 of the hydraulic accumulators 7.

Two rows with in each case four cylindrical, stepped blind bores as receptacles 4' for the brake pressure build-up valves 4 and as receptacles 6' for the brake pressure reducing valves 6 are made in the underside 15 of the hydraulic block 13 between the connectors 5' for the wheel brakes 5 and the receptacles 8' for the hydraulic pumps 8. The receptacles 4' for the brake pressure build-up valves 4 are situated in a row parallel to the transverse sides 16 of the hydraulic block 13 next to one another, closer to the connectors 5' for the wheel brakes 5. The receptacles 6' for the pressure reducing valves 6 are likewise situated in a row parallel to the transverse sides 16 of the hydraulic block 13 next to one another between the receptacles 4' for the brake pressure build-up valves 4 and the receptacles 8' for the internal gear pumps 8.

Two stepped blind bores as receptacles 3' for the separating valves 3 are made in the underside 15 of the hydraulic block 13 in a manner which is offset obliquely outside the receptacles 8' for the hydraulic pumps 8 and in the direction of the receptacles 7' for the hydraulic accumulators 7. The solenoid valves 3, 4, 6 of the slip control means 12 are installed with their hydraulic parts into the receptacles 3', 4', 6', and their magnetic parts with coils and armatures protrude to the outside from the underside 15 of the hydraulic block 13.

In a longitudinal center of the hydraulic block 13, a flat cylindrical countersunk depression as receptacle 11' for the pressure sensor 11 of the brake circuit I is made in the underside 15 of the hydraulic block 13. The receptacle 11' for the pressure sensor 11 is situated close to the receptacles 8' for the internal gear pumps 8 in a manner which is offset in the direction of the receptacles 7' for the hydraulic accumulators 7.

The receptacles 8' for the internal gear pumps 8 have an annular step 18 which, together with a complementary annular step of a pump housing (not shown) of the internal gear pumps 8, forms a circumferential channel. The internal gear pumps 8 (not illustrated) are configured in a cartridge design; they have cylindrical pump housings which can be considered to be cartridges. The cylindrical cartridges which form the pump housings of the internal gear pumps 8 have the abovementioned annular step, which annular steps are at an axial spacing from the annular steps 18 of the receptacles 8' for the internal gear pumps 8 in the hydraulic block 13, with the result that the annular steps 18 of the receptacles 8' for the internal gear pumps 8 and the annular steps of the cartridges of the internal gear pumps 8 enclose the abovementioned circumferential channel between them when the internal gear pumps 8 are inserted or installed into the receptacles 8' in the hydraulic block 13.

For the connection of the connectors 2' for the brake master cylinder 2 to the separating valve 3 and the pressure limiting valve 9 of the hydraulic accumulator 7, the hydraulic block 13 has an upper longitudinal bore 19 for each brake circuit I, II, which upper longitudinal bores 19 pass under the upper side 14 of the hydraulic block 13 laterally outside the receptacles 8' for the gear pumps 8. The upper longitudinal bores 19 begin on that transverse side 16 of the hydraulic block 13, in which the connectors 5' for the wheel brakes 5 are made, and ends at the level of a bottom of the receptacles 9' for the pressure limiting valves 9. With the connectors 2' for the brake master cylinder 2, the upper longitudinal bores 19 are, however, under the upper side 14 of the hydraulic block 13 like the upper longitudinal bores 19, as a result of transverse bores 20 which, as viewed from the upper side 14, are situated between the receptacles 4' for the brake pressure build-up valves 4 and the receptacles 6' for the brake pressure reducing valves 6; the receptacles 4', 6' for the brake pressure build-up and reducing valves 4, 6 are made on the opposite underside 15 of the hydraulic block 13. The transverse bores 20 open into vertical bores 21 which open into longitudinal bores 22, into which short vertical blind bores open which emanate from a bottom of the connectors 2' for the brake master cylinder 2. At their other ends, the upper longitudinal bores 19 cross transverse bores 23, from which vertical bores 24 emanate which open into transverse bores 25 which intersect the receptacles 3' for the separating valves 3 on the circumference. One of the two transverse bores 23 which intersects the end of one upper longitudinal bore 19 runs as far as the longitudinal center of the hydraulic block 13, where it opens into a vertical bore 26 which leads to the receptacle 11' for the pressure sensor 11 which is provided only in one brake circuit I.

Inner longitudinal bores 27 which end approximately between the receptacles 6' for the brake pressure reducing valves 6 emanate from a bottom of the receptacles 7' for the hydraulic accumulators 7. The inner longitudinal bores 27 open eccentrically under the underside 15 of the hydraulic block 13 into the receptacles 7'. The inner longitudinal bores 27 run parallel to and outside the receptacles 9' for the pressure limiting valves 9 which are configured as coaxial projections of the receptacles 7' for the hydraulic accumulators 7. The inner longitudinal bores 27 pass between a bottom of the receptacles 8' for the internal gear pumps 8 and the underside 15 of the hydraulic block 13. The inner longitudinal bores 27 are connected to the bottom of the receptacles 8' for the internal gear pumps 8 and therefore to the suction connectors of the internal gear pumps 8 by way of transverse bores 28 which cross the inner longitudinal bores 27 and short, vertical branch bores which open into the bottom of the receptacles 8' for the internal gear pumps 8. In this way, the hydraulic accumulators 7 communicate by way of the inner longitudinal bores 27 with the suction connectors of the internal gear pumps 8. The short vertical branch bores 29 which open into the bottom of the receptacles 8' for the internal gear pumps can also be considered to be suction connectors of or for the internal gear pumps 8. At their ends which are remote from the receptacles 7' for the hydraulic accumulators 7, the inner longitudinal bores 27 are connected by way of vertical bores 30 and transverse bores 31 to the in each case two receptacles 6' for the brake pressure reducing valves 6 of the two brake circuits I, II, with the result that the brake pressure reducing valves 6 in each brake circuit I, II communicate with the suction connector of the hydraulic pump 8 and the hydraulic accumulator 7 of the respective brake circuit I, II.

Middle longitudinal bores 32 are made laterally outside the receptacles 8' for the internal gear pumps 8 approximately at a middle level of the hydraulic block 13, which middle longitudinal bores 32 open into the transverse side 16, in which the connectors 5' for the wheel brakes 5 are made. The middle longitudinal bores 32 end at the level of the receptacles 3' for the separating valves 3, to which they are connected by way of short, vertical branch bores. The middle longitudinal bores 32 are connected by way of short transverse bores 33 which cross them to the channel which is circumferential on the receptacles 8' for the internal gear pumps 8 and forms the housings of the internal gear pumps 8 by way of the annular steps 18 of the receptacles 8' for the internal gear pumps 8 and the corresponding annular steps on the outer side of the cartridges (not illustrated) of the internal gear pumps 8. By way of the short transverse bores 33, the middle longitudinal bores 32 communicate with the pressure connectors of the internal gear pumps 8. By way of transverse bores 34 which cross the middle longitudinal bores 32 at the level of the receptacles 4' for the brake pressure build-up valves 4, the middle longitudinal bores 32 communicate with the receptacles 4' for the brake pressure build-up valves 4. The longitudinal bores 32 connect the separating valves 3' to the pressure connectors of the internal gear pumps 8 and the inlet valves 4.

Openings of the above-described bores on outer sides of the hydraulic block 13 are closed in a pressure-tight manner by way of bores which are pressed in or in another suitable way.

The designations of the longitudinal bores 19, 27, 32 as upper, inner and middle longitudinal bores 19, 27, 32 is arbitrary and serves exclusively to distinguish between them.

Neither a cuboidal hydraulic block 13 nor Cartesian bores are mandatory for the disclosure, but are considered to be advantageous. Fitted with the components of the slip control means of the vehicle brake system 1, that is to say the solenoid valves 3, 4, 6, the internal gear pumps 8 which form the hydraulic pumps of the slip control means 12, the hydraulic accumulator 7 with the pressure limiting valve 9 and the pressure sensor 11 and optionally the electric motor 10 (not illustrated) which is attached on the upper side 14 of the hydraulic block 13 for driving the internal gear pumps 8, the hydraulic block 13 according to the disclosure forms a hydraulic assembly of the slip control means 12.

What is claimed is:

1. A hydraulic block arrangement for a slip-controlled vehicle brake system, comprising:
   a hydraulic block comprising:
      a plurality of receptacles configured to receive hydraulic components of a slip control system, the plurality of receptacles including a first receptacle and a second receptacle, both the first and second receptacles being defined in a first surface of the hydraulic block; and
      a plurality of connections configured to connect to external components of the vehicle brake system;
   a first gear pump arranged in the first receptacle, the hydraulic block defining a first fluid-conducting pump connector countersunk into a bottom of the first receptacle, the first pump connector being in fluid communication with the first gear pump; and
   a second gear pump arranged in the second receptacle.

2. The hydraulic block arrangement according to claim 1, wherein the first receptacle includes a second fluid-conducting pump connector arranged at a side of a circumference of the first receptacle and a circumferential channel that fluidly communicates with the second pump connector.

3. The hydraulic block arrangement according to claim 2, wherein:
   the first pump connector is a suction connector connected to a suction port of the first gear pump; and
   the second pump connector is a pressure connector connected to a pressure port of the first gear pump.

4. The hydraulic block arrangement according to claim 3, the hydraulic block further comprising:
   an inner longitudinal bore connecting the suction connector to at least one of:
      a sixth receptacle of the plurality of receptacles in which a hydraulic accumulator is arranged; and
      a seventh receptacle of the plurality of receptacles in which a brake pressure reducing valve of a slip control system of the vehicle brake system is arranged.

5. The hydraulic block arrangement according to claim 3, the hydraulic block further comprising:
   a middle longitudinal bore connecting the pressure connector to at least one of:
      an eighth receptacle of the plurality of receptacles in which a separating valve is arranged; and
      a ninth receptacle of the plurality of receptacles in which a brake pressure build-up valve of a slip control system of the vehicle brake system is arranged.

6. The hydraulic block arrangement according to claim 3, the hydraulic block further comprising:
   an inner longitudinal bore hydraulically connecting the suction connector to:
      a third receptacle of the plurality of receptacles in which a hydraulic accumulator is arranged; and
      a fourth receptacle of the plurality of receptacles in which a brake pressure reducing valve of a slip control system of the vehicle brake system is arranged.

7. The hydraulic block arrangement according to claim 6, wherein the inner longitudinal bore includes a first portion extending from the fourth receptacle to a connection with the suction connector, and a second portion extending from the connection with the suction connector to a connection with the third receptacle.

8. The hydraulic block arrangement according to claim 6, the hydraulic block further comprising:
   an upper longitudinal bore hydraulically connecting a first connection of the plurality of connections, which is connected to a brake master cylinder, to:
      the second receptacle; and
      a fifth receptacle of the plurality of receptacles in which a separating valve of the slip control system is arranged;
   wherein a portion of the upper longitudinal bore runs past the first receptacle.

9. The hydraulic block arrangement according to claim 8, the hydraulic block further comprising:
   a middle longitudinal bore hydraulically connecting the pressure connector to:
      the fifth receptacle; and
      a sixth receptacle of the plurality of receptacles in which a brake pressure build-up valve of the slip control system is arranged.

10. The hydraulic block arrangement according to claim 1, wherein the hydraulic block is mirror-symmetrical with respect to a center longitudinal axis.

11. The hydraulic block arrangement according to claim 1, the hydraulic block further comprising:
   an upper longitudinal bore connecting a first connection of the plurality of connections, which is configured to connect to a brake master cylinder, to at least one of:
      a third receptacle of the plurality of receptacles in which a hydraulic accumulator is arranged;
      a fourth receptacle of the plurality of receptacles in which a pressure sensor is arranged; and
      a fifth receptacle of the plurality of receptacles in which a separating valve is arranged;
   wherein a portion of the upper longitudinal bore runs past the first receptacle.

12. The hydraulic block arrangement according to claim 1, wherein the hydraulic block defines a third fluid-conducting pump connector countersunk into a bottom of the second receptacle, the third pump connector being in fluid communication with the second gear pump.

13. The hydraulic block arrangement according to claim 12, wherein the second receptacle includes a fourth fluid-conducting pump connector arranged at a side of a circumference of the second receptacle and a second circumferential channel that fluidly communicates with the fourth pump connector.

14. The hydraulic block arrangement according to claim 13, wherein:
   the third pump connector is a suction connector connected to a suction port of the second gear pump; and
   the fourth pump connector is a pressure connector connected to a pressure port of the second gear pump.

15. The hydraulic block arrangement according to claim 1, wherein the hydraulic block includes a second surface opposite the first surface, two longitudinal side surfaces connecting the first and second surfaces, and two transverse side surfaces connecting the first and second side surfaces, and a first surface area of the first surface is greater than a second surface area of the longitudinal side surfaces and a third surface area of the transverse side surfaces.

* * * * *